BEST AVAILABLE COPY
144. WOOD-WORKING,
Shaping,
Miscellaneous.
2 Sheets-Sheet 1.
B. & M. Redheffer,
Making Combs.
Patented May 26, 1834.
8,220x.
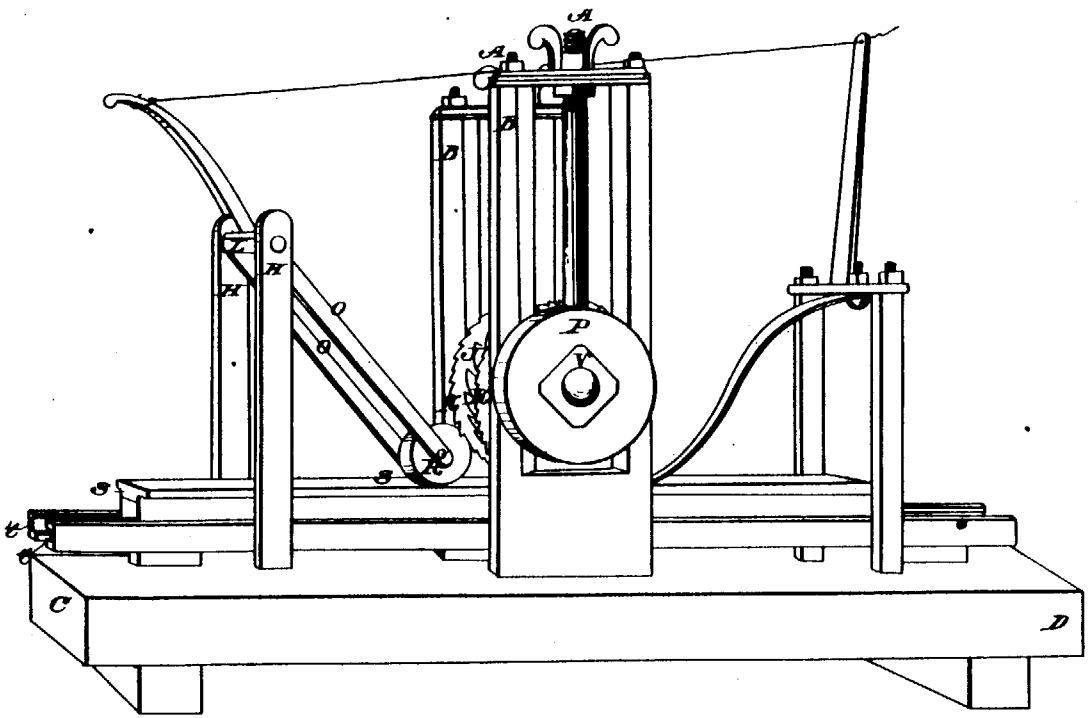

BEST AVAILABLE COPY
144. WOOD-WORKING,
Shaping,
Miscellaneous.
2 Sheets-Sheet 2.
B. & M. Redheffer,
Making Combs.
Patented May 26, 1834.
8220x.
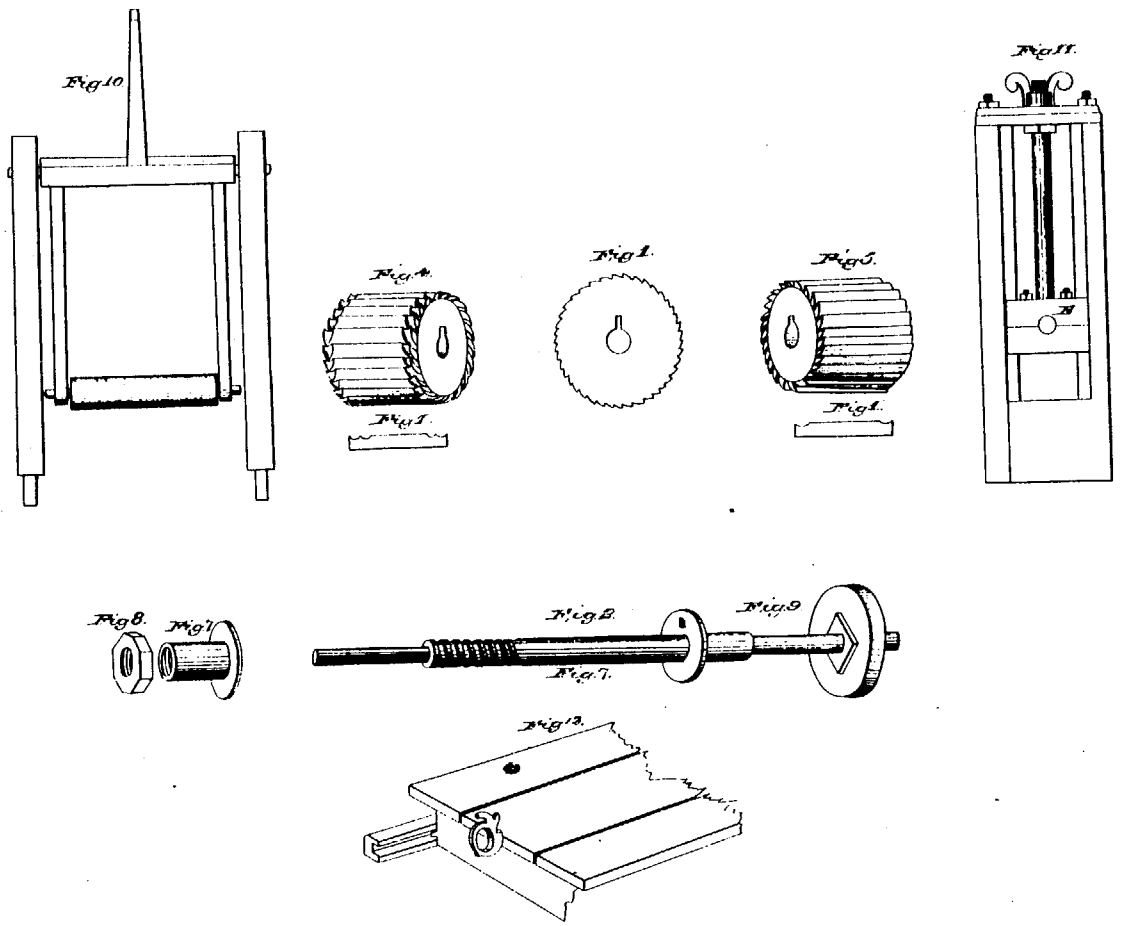

Benjamin Redheffer and William Redheffer. Penn Township. Pennsylvania 8220X

Letters Patent

The Schedule referred to in these Letters Patent, and making part of the same containing a discription in the words of the said Benjamin Redheffer and William Redheffer themselves of their improvement in comb making.

To All To whom these presents shall come: Be it Known that We Benjamin and William Redheffer of Penn Township in the County of Philadelphia and State of Pennsylvania have invented a new and useful improvement in Comb making. Used a getting out and quilling Machine and that the following is a full and exact description of the construction and operation of the said Machine as invented by us.

The said Machine consists of revolving scrapers or cutters of different sizes these scrapers can be made of cast steel or wrought from the solid by cutting teeth in them. or they can be made with knives or scrapers set round an axle or cylinder with the concavities in them so as to produce the quills or risings. in the piece — The plane scraper will do for all sizes if it is made about twelve inches long. The quilling scrapers there must be one to every size that is in width for example. a piece that is to have inch and a half teeth cut in it and the quills 1/4 of an inch each therefore the quilling scraper must be two inches wide and the space between the quills must one inch and a half and so on to any size The quilling scraper may be used in a duplicate ratio on the same axle if the travelling table is neatly adjusted on the same axle. See the drawing plate first. C.C. - the plane into which the uprights are let. B.B. with their sliding Boxes E.E. The rods A.A. are fastened to them with threads cut on the ends of them to admit the small nuts .a.a. so that the Boxes E. E which holds the axle of the revolving scraper I. which can be raised or lowered by the screws A.A. the saws K.K. is fasten ed to the ends of the scraper I. to regulate the width. P the pulley fasten ed to the axle of the revolving scraper I with the small nut V. & the

8220X travelling table or sliding plane working in the grooves T.T. H H the up
rights to support the axle L. O.O the arms to support the roller R. the arms
N is fastened to the spring F with the chain m. which presses the roller
R. on the moving plane B which is pushed forward and passes under the
roller R which keeps the piece level and prevents it from [illegible]. Plate 2d.
fig. 12. the moving plane fig 11. the upright fig 10 the roller and its frame
fig. 9. The pulley Fig 8. O the nuts. fig 7 the axle cylinder fig 5. The
plain revolving scraper fig 4. The quilling or concave scraper fig 3. The
axle fig 2. The saws Fig 1.1. will show the shape of the knives or scra
pers which can be set round an axle or cylinder any number of them may
be used to form one like fig 4. the plain scraper can be made the same.
Omitted to state in the above that the quilling and plain revolving scra-
per is so constructed as to slide on and off the axle. so that the same
axle may do for any size quiller. see the analytical drawing plate 2nd
figs 3.4. 5.7. there may be two or more of the quilling scrapers used
on the axle at once if the workmen can attend to them.
The diameters of the revolving cutters or scrapers may be from two to three
inches Exd. Witnesses
WH. John R Walker
Andw M Garnet William Redheffer
Benjamin Redheffer ([illegible])

[illegible] 26 Aug 1834
Drawing made